United States Patent [19]

Novello

[11] Patent Number: 5,453,042

[45] Date of Patent: Sep. 26, 1995

[54] FISH SKIN REMOVAL DEVICE

[76] Inventor: Joseph B. Novello, 22 Balcom Rd., Pelham, N.H. 03076

[21] Appl. No.: 334,237

[22] Filed: Nov. 4, 1994

[51] Int. Cl.$^6$ .................................................. A22C 25/17
[52] U.S. Cl. ........................................... 452/128; 451/196
[58] Field of Search ................................. 452/128, 125, 452/130, 196

[56]  References Cited

U.S. PATENT DOCUMENTS

| | | | |
|---|---|---|---|
| 1,960,643 | 5/1934 | Lorenzen | 452/128 |
| 2,932,849 | 4/1960 | Missman | 452/196 |
| 3,371,375 | 3/1968 | Bartel | 452/128 |
| 3,621,514 | 11/1971 | Brown | 452/128 |
| 4,299,009 | 11/1981 | Tournier | 452/128 |

*Primary Examiner*—Willis Little
*Attorney, Agent, or Firm*—Frederick R. Cantor

[57]  ABSTRACT

A device for removing skin from a fish, includes a flat table-like support for the fish body, and a spike-like anchoring means adapted to penetrate the head of the fish during the skin-removal operation. A skin clamp mechanism is powered by a motor-driven chain conveyor to move along the fish body for pulling the skin from the fish body. As the skin clamp mechanism reaches the end of its stroke an arm structure is elevated from the fish support to press down on the partially severed fish skin. The skin-clamp mechanism reverses direction so that the fish skin is looped around a roller on the arm structure as the skin-clamp mechanism returns to its starting position. The arm structure prolongs the skin-removal process into a two-direction operation, so that a relatively long length of fish can be accommodated in a given length device.

20 Claims, 3 Drawing Sheets

FISH SKIN REMOVAL DEVICE

BACKGROUND OF THE PRESENT INVENTION

1. Field of the Invention

The present invention relates to a motor-operated device for removing skin from the body of a fish.

2. Prior Developments

The processing of fish taken from the ocean by commercial fishermen sometimes includes the step of removing the skin from the fish. Often the skin-removing operation is performed on board the vessel, prior to its return to port.

Removing the fish skin by hand is time-consuming and sometimes difficult to accomplish, due to the fact that the ship is often rolling and pitching as it moves through the water.

It would be desirable to have a fish-skinning device that is at least semi-automatic in operation, whereby the fish-skinning operation can be accomplished expeditiously and efficiently on board a fishing vessel.

SUMMARY OF THE PRESENT INVENTION

The present invention relates to a fish-skinning device, wherein a fish body is anchored to a table top by means of a manually operable spike insertable through the head of a fish body. A clamp mechanism is engaged with the skin of the fish at a location near the fish head. Removal of the skin from the fish body is accomplished by moving the clamp means longitudinally along the table away from the anchoring spike, whereby the skin is pulled from the fish body.

A pop-up arm structure is located in the path of the clamp mechanism, so that when the clamp mechanism approaches its end limit position the arm structure is raised to a position overlying the partially severed fish skin. As the clamp mechanism returns toward its starting position the fish skin is looped around the partially severed fish skin, whereby the skin is disconnected from the fish body by tension forces applied to the skin connection point.

The clamp mechanism is cyclically powered by a motor-operated conveyor, or actuator, that is reversible, whereby the clamp mechanism can move forwardly from a starting position to an end limit position, and then reversely back to the starting position without interruption. The fish-skinning operation is thus accomplished quickly and expeditiously, without requiring the clamp mechanism to be repositioned at the end of each cycle. The motor-operator conveyor (or actuator) can take several forms, e.g. a chain conveyor or a linear nut screw apparatus. Limit switches can be used to reverse the motion of the clamp mechanism.

The pop-up arm structure is used for the purpose of reducing the overall length of the apparatus, so that the apparatus can be accommodated on board relatively small fishing vessels. The arm structure acts as a pulley, so that the partially severed fish skin can be continued to be pulled from the fish body while the clamp mechanism is returning from the end limit position to the starting position. Since the fish-skinning operation is performed while the clamp mechanism is moving in both directions (forwardly and reversely) the overall length of the apparatus can be kept reasonably small, without sacrificing the fish length that can be handled. A range of fish lengths can be accommodated in the apparatus.

In summary, and in accordance with the above discussion, the foregoing objectives are achieved in the following embodiments:

1. A device for removing skin from a fish body, comprising:

an elongated fish support means;

means for anchoring the head of a fish located on the fish support means;

clamp means engageable with the skin of a supported fish at a point near the fish's head;

powered means for moving said clamp means forwardly from a starting position to an end limit position, and then reversely back to the starting position; and an arm structure engageable with the skin of the fish as the clamp means approaches the end limit position, whereby the skin is looped around the arm structure to sever the skin from the fish body while the clamp means is returning to the starting position.

2. The device, as described in paragraph 1, wherein said clamp means comprises a lower jaw insertable into a slit in the fish body, and an upper jaw movable downwardly toward the lower jaw so that the skin of the fish is gripped therebetween.

3. The device, as described in paragraph 2, wherein said fish support means comprises a fish support surface, and a cam projecting from said support surface; and said upper jaw comprising a cam follower engageable with said cam when said clamp means is in its starting position, whereby the upper jaw is raised away from the lower jaw.

4. The device, as described in paragraph 3, and further comprising spring means biasing said upper jaw downwardly toward said lower jaw so that when the clamp means is moved from the starting position said cam follower is disengaged from said cam to enable said spring means to move said upper jaw downwardly.

5. The device, as described in paragraph 3, wherein said cam is a roller.

6. The device, as described in paragraph 2, wherein said upper jaw has a downwardly facing sharpened edge adapted to penetrate the skin of the fish when the upper jaw is moved downwardly.

7. The device, as described in paragraph 1, wherein said fish support means comprises a table top having two longitudinal side edges, and guide channels extending along said side edges; and said clamp means comprising a carrier having support elements movable in the guide channels so that the carrier moves parallel to the table top.

8. The device, as described in paragraph 7, wherein said clamp means comprises a lower jaw insertable into a slit in the fish body, and an upper jaw movable downwardly toward the lower jaw so that the skin of the fish is gripped between the two jaws.

9. The device, as described in paragraph 8, and further comprising a roller mounted in the table top so that a portion of the roller is located above the table top surface; and said upper jaw having a cam follower engageable with said roller when the clamp means is in its starting position, whereby the upper jaw is then raised away from the lower jaw.

10. The device, as described in paragraph 9, and further comprising means for pivotably mounting said jaws in the carrier so that the jaws can rotate as a unit around a horizontal axis extending transverse to the movement axis of the carrier.

11. The device, as described in paragraph 10, and further comprising stop means for limiting the pivotal movement of said jaws to approximately thirty degrees.

12. The device, as described in paragraph 1, wherein said anchoring means comprises a handle swingably connected to said fish support means, and a fish-penetrating spike carried by said handle, whereby movement of the handle in one direction causes the spike to penetrate the head of the fish, and movement of the handle in the opposite direction releases the spike from the head of the switch.

13. The device, as described in paragraph 12, wherein said powered means comprises a reversible electric motor; and said device further comprising a motor control switch operated by the swingable handle so that movement of the handle in said one direction causes the motor control switch to operate the motor in the direction that moves the clamp means forwardly from the starting position toward the end limit position.

14. The device, as described in paragraph 1, wherein said arm structure has an operating position and a retracted position; and said clamp means being interconnected with said arm structure so that the arm structure is moved from its retracted position to its operating position as the clamp means approaches its end limit position.

15. The device, as described in paragraph 14, wherein said fish support means comprises a horizontal table top; and said arm structure being pivotably connected to said table top for swinging movement between a retracted position located substantially entirely below the table top surface and an operating position above the table top surface.

16. The device, as described in paragraph 15, wherein said arm structure comprises a roller located above the table top surface when the arm structure is in its operating position.

17. The device, as described in paragraph 15, and further comprising a cam operator means for moving said arm structure between its retracted position and its operating position; said cam operator means comprising a first plate slidably mounted on said table top for movement parallel to the movement axis of said clamp means, and a second plate slidably mounted on said table top for movement transverse to the movement axis of said clamp means.

18. The device, as described in paragraph 17, and further comprising cam slot means in one of said plates, and pin means on the other plate; and said cam slot means and said pin means being operatively connected so that said first plate acts as an operator for said second plate.

19. The device, as described in paragraph 18, wherein said clamp means comprises a carrier having a lower wall portion located below said table top; and said first plate being in horizontal registry with the lower wall portion of the carrier so that when the carrier is approaching the end limit position said first plate is moved to operate the second plate.

20. The device, as described in paragraph 19, and further comprising a flexible connector extending between said first plate and the lower wall portion of the carrier so that when the carrier is approaching the starting position said first plate is pulled to a position wherein said arm structure is lowered to its retracted position.

A BRIEF DESCRIPTION OF THE DRAWINGS

DESCRIPTION OF THE PREFERRED
EMBODIMENTS OF THE PRESENT
INVENTION

Figure 1:
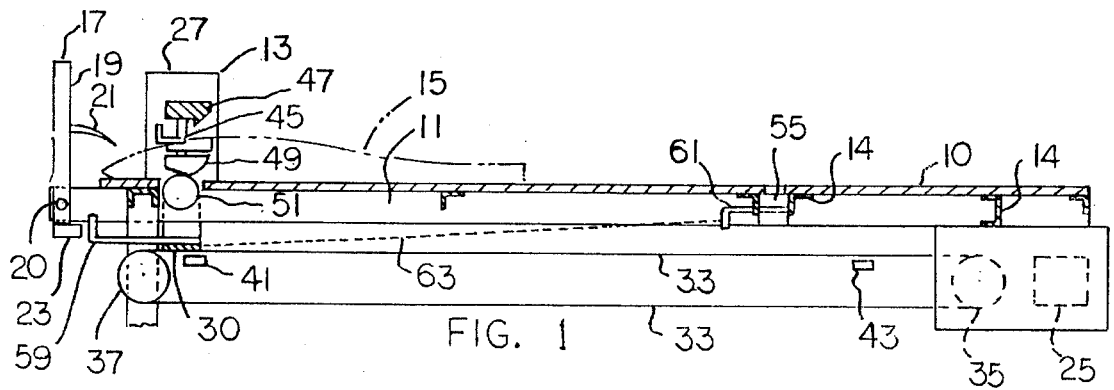
FIG. 1, is a diagrammatic view of fish skin removing apparatus embodying the invention. The apparatus is shown in a position prior to starting the skin-removal operation.

FIG. 1, is a diagrammatic view of fish skin removing apparatus embodying the invention. The apparatus is shown in a position prior to starting the skin-removal operation.

Figure 2:
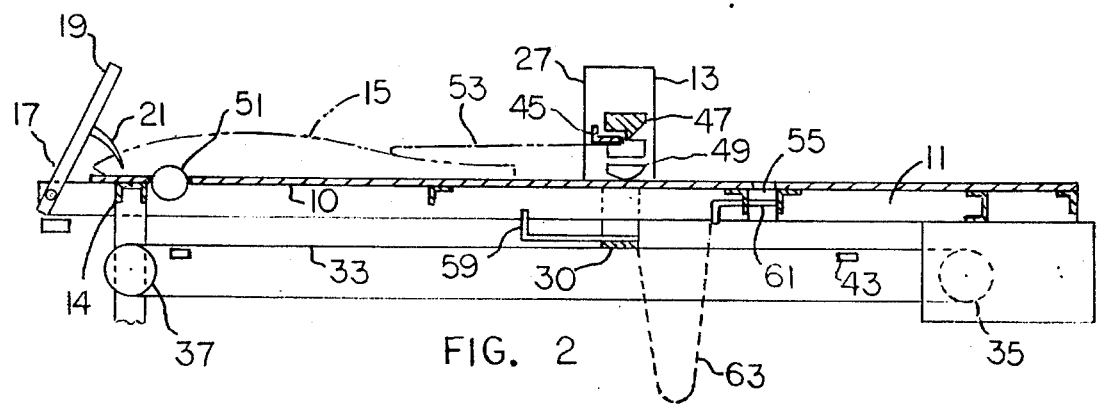
FIG. 2, is a view taken in the same direction as FIG. 1, but showing the apparatus with a skin clamp mechanism travelling rightwardly from a starting position toward an end limit position.

FIG. 2, is a view taken in the same direction as FIG. 1, but showing the apparatus with a skin clamp mechanism travelling rightwardly from a starting position toward an end limit position.

Figure 3:
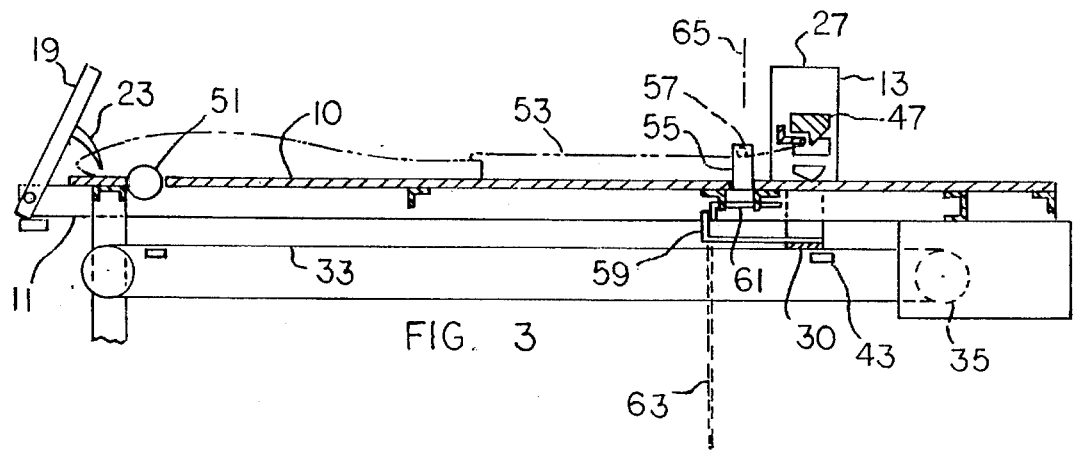
FIG. 3, is a view taken in the same direction as FIGS. 1 and 2, but showing the skin clamp mechanism in the end limit position, prior to returning leftwardly to the starting position.

FIG. 3, is a view taken in the same direction as FIGS. 1 and 2, but showing the skin clamp mechanism in the end limit position, prior to returning leftwardly to the starting position.

Referring to FIGS. 1 through 3, there is shown a skin-removal device used on a fish body, according to the present invention. The device was designed particularly for removing skin from dogfish on board a fishing vessel. It is believed, however, that the device can readily be used on other fish varieties.

Figure 4:
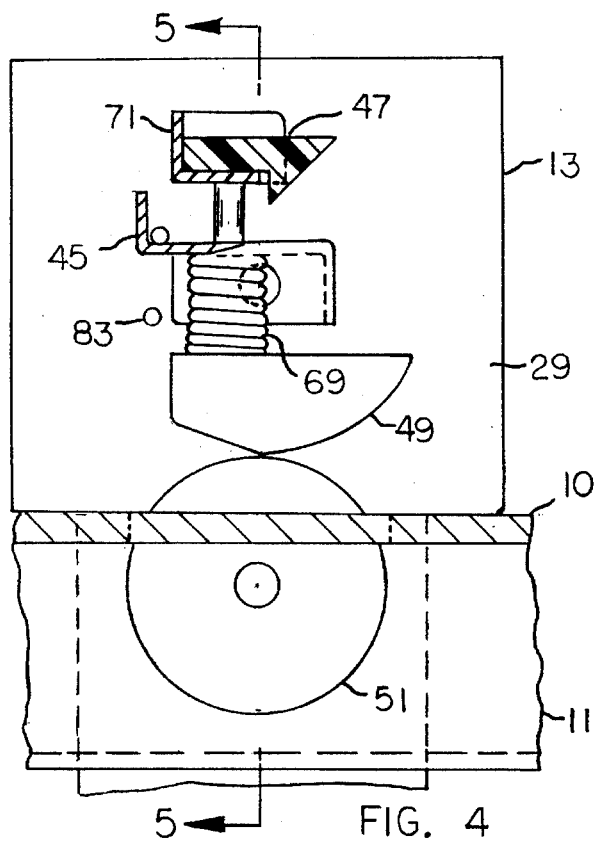
FIG. 4, is a fragmentary, enlarged, sectional view of a skin-clamp mechanism used in the FIG. 1 apparatus.
Figure 5:
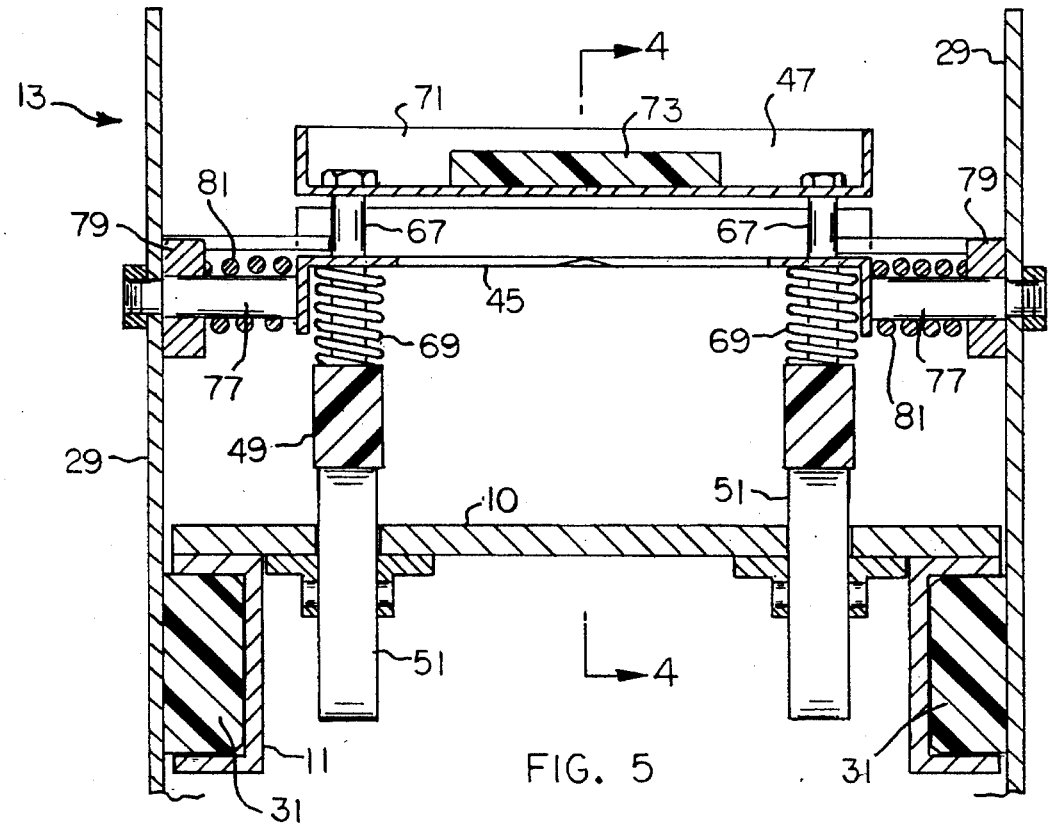
FIG. 5, is a transverse sectional view taken on line 5—5 in FIG. 4.

FIG. 5, is a transverse sectional view taken on line 5—5 in FIG. 4.

The illustrated device comprises a table top 10 having longitudinal side edge areas secured to two longitudinally extending guide channels 11. As shown in FIG. 5, the guide channels 11 face in opposite directions to act as guides for a skin clamp means 13. The table top 10 is supported by means of legs, not shown in the drawings.

Various transverse bars 14 extend between guide channels 11 to rigidify the table top structure. These transverse bars 14 can have various cross sectional shapes, e.g., channels or angle irons, suitable for rigidifying the table top. The rigidified table top forms a flat support surface for a fish body 15. The fish body is manually placed on the table top, with the head of the fish located near the left end of the table top. The tail of the fish is preferably cut off prior to placement of the fish body on the table top (or while the fish body is on the table top). Also, a transverse slit is cut into the back of the fish body a short distance behind the head of the fish. This transverse slit forms an opening in the fish's skin for accommodating a lower jaw of the skin-clamp means 13.

A fish anchoring means 17 is supported at the left end of the table top for holding the fish body in a fixed position during the skin-removal operation. As shown in FIGS. 1 through 3, the fish anchoring means 17 comprises a manual handle 19 having a pivotal connection 20 with the fixed guide channels 11, whereby the handle 19 can be manually swung between the raised position shown in FIG. 1, and the lowered position shown in FIGS. 2 and 3.

A curved spike 21 is associated with handle 19, so that when the handle is swung down, the spike penetrates the head of the fish to hold the fish body in a fixed position on table top 10. A motor control switch 23 is located below the lower end of handle 19 for energizing electric motor 25 when the handle is swung down to the FIG. 2 position. A cam on the lower end of the handle 19 engages a roller actuator on switch 23 to operate the switch in the desired fashion.

Skin clamp means 13 comprises a carrier 27 that has two vertical side walls 29 (FIG. 5) and a transverse horizontal wall 30. The carrier 27 has a U-shaped configuration, as viewed in the transverse direction (normal to the plane of the paper in FIGS. 1 through 3). Two slide blocks 31 (FIG. 5) are secured to the side walls of carrier 27 for movement in guide channels 11, whereby the carrier 27 can be moved rightwardly along the table top 10 from the FIG. 1 starting position to the FIG. 3 end limit position, and then leftwardly back to the starting position. During such motion of the carrier the skin clamp means removes the skin from the fish body.

Anchoring means 17 holds the fish body in place during the skin-removal operation.

The motive force for moving carrier 27 back and forth is provided by a chain conveyor, that includes a chain 33 trained around two sprockets 35 and 37. Sprocket 35 is located within a water-tight enclosure 39 located at the right end of table top 10. The reversible electric motor 25 is located within enclosure 39 for driving sprocket 35 at a speed whereby the carrier 27 moves through a complete cycle (forward and back to the starting position) in a reasonably short period of time, e.g., less than ten seconds. Speed reducer gearing can be employed between motor 25 and sprocket 35 to achieve a desired sprocket rotational speed. Chain 33 is attached to wall 30 of carrier 27 for transmitting power from the chain 33 to the carrier 27.

As an alternative to the chain 33, a screw-travelling nut assembly could also be used. In such case the motor-operated screw would be located below the table top, with the travelling nut attached to carrier 27.

Reversible electric motor 35 is controlled by control switch 23 and two limit switches 41 and 43. Switch 43 reverses the electric connections to motor 35 when carrier 27 reaches the end limit position (FIG. 3), whereby the carrier automatically returns to the starting position (FIG. 1). Switch 41 de-energizes the motor when the carrier reaches the starting position. Logic circuitry associated electrically with the three switches causes the motor 35 to be energized in the forward direction after handle 19 has been raised and then lowered (to actuate motor control switch 23). Handle 19 acts as a triggering device to initiate the skin-removal operation. Handle 19 also acts as a safety device to prematurely terminate the operation, if such action is desired for any reason. Raising handle 19 de-energizes motor 35 irrespective of the electric states of limit switches 41 and 43.

FIG. 4, is a fragmentary, enlarged, sectional view of a skin-clamp mechanism used in the FIG. 1 apparatus.

Figure 6:
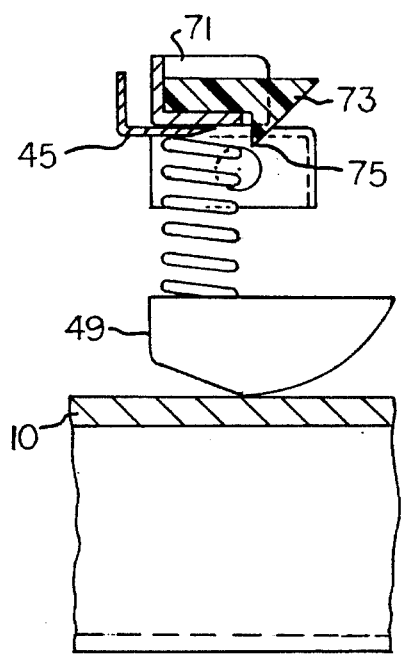
FIG. 6, is a sectional view taken in the same direction as FIG. 4, but showing the clamp mechanism in a closed condition.

FIG. 6, is a sectional view taken in the same direction as FIG. 4, but showing the clamp mechanism in a closed condition.

Skin clamp means 13 comprises a lower jaw 45 insertable into a slit cut in the back surface of the fish body 15. Cooperating with jaw 45 is an upper jaw 47 mounted for downward motion so that the skin of the fish is gripped between the two jaws. Cam followers 49 are associated with the upper jaw 47 in cooperative relationship with two roller cams 51 mounted in table top 10.

FIG. 1 shows upper jaw 47 raised away from lower jaw 45, due to the fact that cam followers 49 are engaged with roller cams 51. The lower Jaw 45 is shown inserted into the transverse slit in the fish body. The fish body 15 is placed on the table top 10 and shifted leftwardly so that the transverse slit moves onto the leading edge of jaw 45. Jaw 45 has a sharpened V-shaped leading edge that enables the jaw to readily penetrate the slit cut in the back of the fish body.

As the fish clamp means is moved rightwardly from the FIG. 1 starting position (by lowering handle 19 to energize motor 25) the cam followers 49 move off the roller cams 51 toward table top 10; a spring means associated with upper jaw 47 moves the upper jaw downwardly to forcibly grip the upper surface of the fish skin. The fish skin is thus forcibly gripped between the two jaws 45 and 47. Lower jaw 45 engages the inner surface of the fish skin, whereas upper jaw 47 engages the outer exterior surface of the fish skin.

FIG. 2 shows the skin clamp means 13 in an intermediate position, i.e., between the starting position (FIG. 1) and the end limit position (FIG. 3). The fish skin 53 is shown being pulled off the fish body by the rightward motion of the clamp means 13. Fish anchoring means 17 holds the fish body in a fixed position on the table top (fish support surface) 10.

As the skin clamp means 13 approaches (or reaches) the FIG. 3 end limit position, an arm structure 55 is moved from a retracted position below table top 10 to an elevated operating position wherein a roller on the arm structure 55 overlies the skin 53 torn from the fish body. In FIG. 3 the roller is designated by numeral 57.

Arm structure 55 is swingably connected to the table top for swinging movement around a horizontal axis, so that during the latter stages of the arm structure motion to the operating position, roller 57 moves in a downward arc to press downwardly against the fish skin.

The motive force for moving arm structure 55 from its retracted position to its elevated operating position is supplied by carrier 27 as it approaches the end limit position. An upstanding lip structure 59 on the carrier strikes the left end of an actuator plate 61 associated with arm structure 55, such that plate 61 is shifted a slight distance to the right (in FIG. 3); the plate 61 movement forces the arm structure 55 to move upwardly to its operating position, as shown in FIG. 3.

In the FIG. 3 position, roller 57 is located slightly below jaw 45 on skin clamp means 13. When the skin clamp means 13 moves leftwardly from the end limit position to the starting position (FIG. 1) the partially severed fish skin 53 is looped around roller 57 so as to pass over the portion of the skin still attached to the fish body 15.

Leftward motions of the skin clamp means 13 exerts a tension force on the fish skin, whereby the skin is completely disconnected from the fish body. The looping action of the skin around roller 57 enables the apparatus to achieve a skin-removing operation without having to unduly lengthen the length of fish support surface 10. When the fish body is relatively long (e.g. longer than the fish body shown in FIGS. 1 through 3) the reverse (leftward) motion of clamp means 13 is used to tear the additional length of skin from the fish body. A relatively long fish can be accommodated on a given length table top 10.

A flexible wire (or chain) 63 is connected between carrier 27 and the aforementioned actuator plate 61. The length of flexible connector 63 is selected so that when carrier 27 nears the starting position (FIG. 1) the connector 63 is in a taut condition. The flexible connector exerts a pulling force on plate 61, to move the plate to the left; leftward motion of the plate causes the arm structure 55 to be lowered to the retracted condition located substantially entirely below table top 10.

The reason for making arm structure 55 retractable is to enable the skin clamp means 13 to move to the right of arm structure before the arm structure is in its operating condition; the arm structure 55 is prevented from interfering with rightward motion of skin clamp means 13. When the two jaws 45 and 47 reach an imaginary plane 65, the lip structure 59 strikes plate 61 for raising the arm structure 55 to its operating position. Roller 57 exerts a downward force on the partially severed skin 53, so that the skin is looped around the roller when the skin clamp means 13 moves leftwardly back to the FIG. 1 starting position.

FIGS. 4 through 6 show some structural details of the skin clamp means 13 that are not apparent from FIGS. 1 through 3. Two cam rollers 51 are rotatably mounted in the table structure so that a portion of each roller is above the table surface. Cam followers 49 are connected to upper jaw 47 by means of two vertical rods 67. A compression coil spring 69 encircles each rod 67 between lower jaw 45 and each associated cam follower 49, so that when the skin clamp means 13 moves away from the starting position the coil springs move jaw 47 downwardly toward jaw 45.

FIG. 6 shows the jaws in the closed position. FIG. 4 shows the position of jaw 47 when the skin clamp means 13 is in the starting position; jaw 47 is raised so that the fish body can be shoved leftwardly to push the slit in the fish skin onto the lower jaw 45. The leading edge of jaw 45 is preferably V-shaped in the top plan view to promote insertion of the fish skin onto the jaw 45.

Upper jaw 47 comprises an L-shaped support member 71 and a removable jaw element 73 carried thereon. Jaw element 73 has a downwardly facing sharpened edge 75 designed to penetrate the skin of the fish when the upper jaw is forced downwardly by springs 69 toward the FIG. 6 closed position. Depending on the resistance to penetration offered by the fish skin, jaw 47 may, or may not, reach the FIG. 6 closed position. Coil springs 69 develop sufficient force so that the skin of the fish is firmly gripped between the two jaws. Jaw 45 engages the inner (under) surface of the fish skin, whereas jaw 47 penetrates the outer surface of the fish skin at a point to the right of the tip of jaw 45.

The jaw assembly is rotatably mounted in carrier 27 so that jaws 45 and 47 can pivot as a unit around a horizontal transverse axis defined by two aligned support shafts 77 extending from jaw 45 into bearings 79 mounted on the carrier side walls 29. Torsion springs 81 are provided for biasing the jaw assembly in a clockwise direction, as viewed in FIG. 4. Stops 83 limit the swinging motion of the jaw assembly around the shaft 77 axis approximately thirty (30) degrees.

During rightward motion of the skin clamp means 13 the jaw assembly will be rotated clockwise to the FIG. 6 condition. The pulling force of the skin and the turning force of springs 81 produce clockwise forces on the jaw assembly. During leftward motion of the skin clamp means 13 the jaw assembly may pivot slightly in a counterclockwise direction as a result of changes in the skin pulling force. The pivotal mounting of the jaw assembly helps to maintain a good clamp action on the fish skin under a range of different operating conditions.

Figure 7:
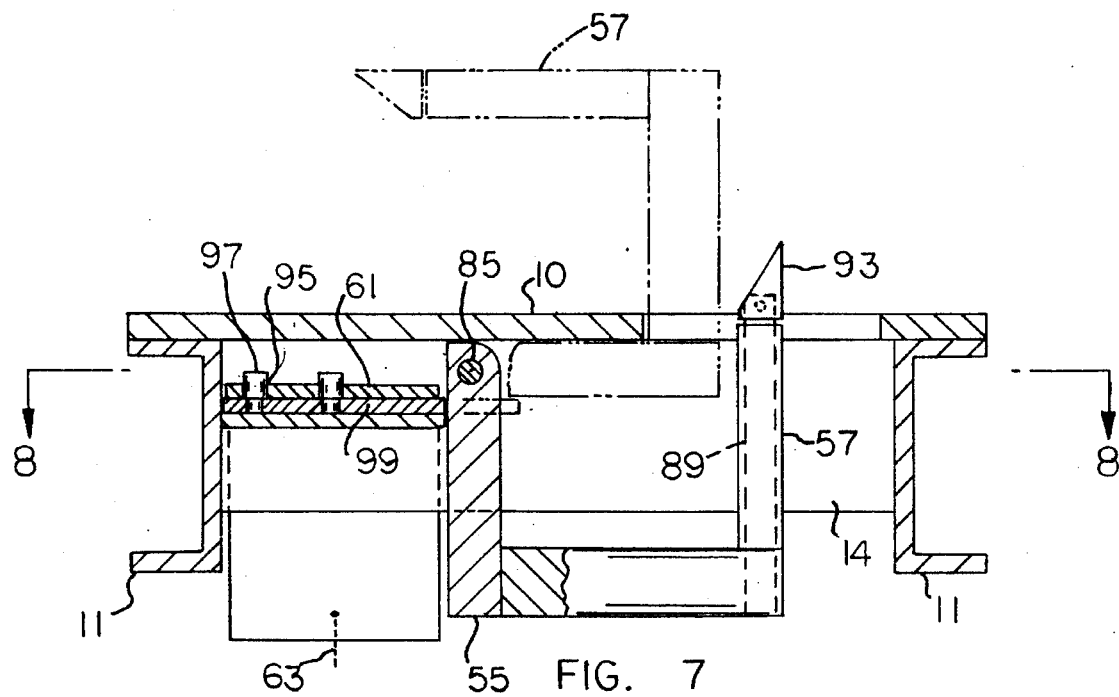
FIG. 7, is a transverse sectional view through a retractable arm structure used in the FIG. 1 apparatus.

FIG. 7, is a transverse sectional view through a retractable arm structure used in the FIG. 1 apparatus.

Figure 8:
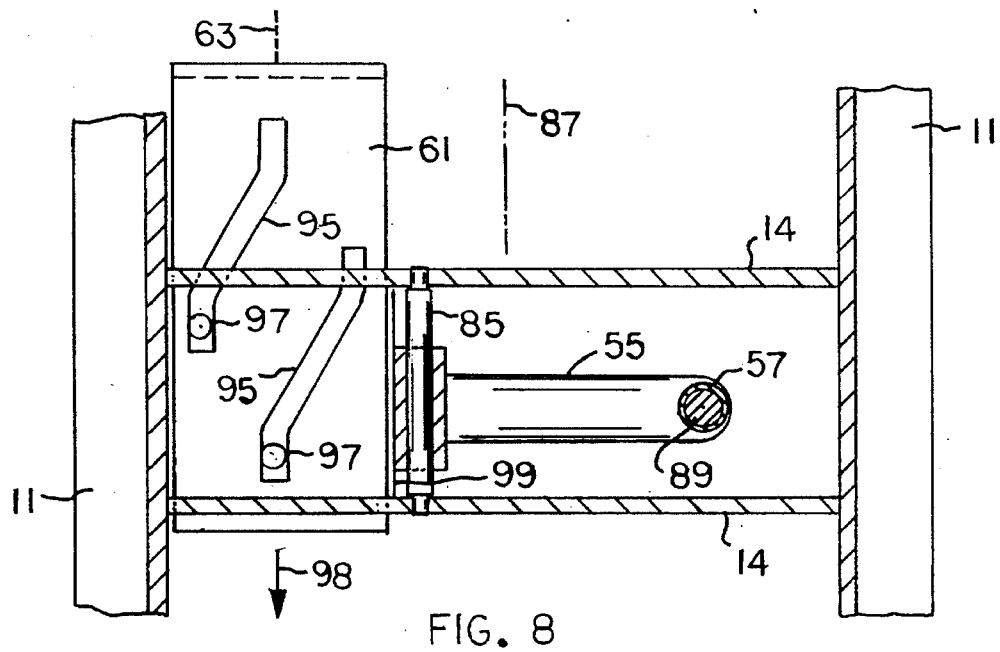
FIG. 8, is a fragmentary sectional view on line 8—8 in FIG. 7.

FIG. 8, is a fragmentary sectional view on line 8—8 in FIG. 7.

FIGS. 7 and 8 show features of the retractable arm structure 55. The arm structure is located between two transverse bars 14 so as to be pivotably movable around the axis of a pivot support shaft 85. Shaft 85 extends parallel to the movement axis 87 of skin clamp means, such that arm structure 55 is swingable in a transverse vertical plane normal to the movement axis 87.

Arm structure 55 includes a circular shaft 89 that carries a roller 57. A knife-like cutter element 93 is pivotably attached to the free end of shaft 89 for cutting through any fish skin that might be in the path of the roller during movement of the arm structure from its retracted position to its operating position. In FIG. 7, the retracted position of the arm structure is shown in full lines; the operating position is shown in dashed lines.

Aforementioned actuator plate 61 extends through two horizontal slots in the associated bars 14, whereby the plate is movable in a direction parallel to movement axis 87. Plate 61 has two cam slots 95 therein that accommodate two cam follower pins 97 carried by a second plate 99. Plate 99 is moveably mounted so that it can move in a left-to-right transverse direction, as viewed in FIGS. 7 and 8.

Movement of plate 61 in the direction of arrow 98 (FIG. 8) causes plate 99 to shift rightwardly so that its rightmost edge exerts an actuating force on arm structure 55; the arm structure 55 is thereby raised to the operating position.

Movement of plate 61 in the opposite direction (i.e. upwardly in FIG. 8) causes plate 99 to shift to the left to the FIG. 7 full line position. Arm structure 55 thereby gravitationally moves downward to the retracted position (full line position in FIG. 7).

Plate 61 is moved as a response to the motion of carrier 27. Thus, as viewed in FIG. 3, rightward motion of the carrier causes lip structure 59 to strike plate 61 for moving the plate 61 a limited distance. Plate 61 is moved in the opposite direction by the flexible connector 63. As carrier 27 approaches the starting position (FIG. 1), connector 63 assumes a taut condition for exerting a pulling force on plate 61.

The skin-removing device is advantageous in that fish of varying lengths can be accommodated without unduly increasing the length of table top 10. Retractable arm structure 55 is movable to its operating position in timed relation to the skin clamp means 13, so that the partially severed fish skin 53 can be looped around roller 57 during the return motion of the skin clamp means 13 back to the starting position. During the return motion of the skin clamp means the skin removing operation can be expeditiously completed. At completion of the cycle the skin clamp means is in the starting position ready for the next cycle.

After a new fish body 15 is placed on table 10 in contact with jaw 45 the handle 19 of anchoring means 17 can be pulled down to initiate a new skin removal cycle.

The present invention, described above, relates to a fish skin removal device. Features of the present invention are recited in the appended claims. The drawings contained herein necessarily depict structural features and embodiments of the fish skin removal device, useful in the practice of the present invention.

However, it will be appreciated by those skilled in the arts pertaining thereto, that the present invention can be practiced in various alternate forms and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A device for removing skin from a fish body, comprising:

an elongated fish support means;

means for anchoring the head of a fish located on the fish support means;

clamp means engageable with the skin of a supported fish at a point near the fish's head;

powered means for moving said clamp means forwardly from a starting position to an end limit position, and then reversely back to the starting position; and an arm structure engageable with the skin of the fish as the clamp means approaches the end limit position, whereby the skin is looped around the arm structure to sever the skin from the fish body while the clamp means is returning to the starting position.

2. The device, as described in claim 1, wherein said clamp means comprises a lower jaw insertable into a slit in the fish body, and an upper jaw movable downwardly toward the lower jaw so that the skin of the fish is gripped therebetween.

3. The device, as described in claim 2, wherein said fish support means comprises a fish support surface, and a cam projecting from said support surface; and said upper jaw comprising a cam follower engageable with said cam when said clamp means is in its starting position, whereby the upper jaw is raised away from the lower jaw.

4. The device, as described in claim 3, and further comprising spring means biasing said upper jaw downwardly toward said lower jaw so that when the clamp means is moved from the starting position said cam follower is disengaged from said cam to enable said spring means to move said upper jaw downwardly.

5. The device, as described in claim 3, wherein said cam is a roller.

6. The device, as described in claim 2, wherein said upper jaw has a downwardly facing sharpened edge adapted to penetrate the skin of the fish when the upper jaw is moved downwardly.

7. The device, as described in claim 1, wherein said fish support means comprises a table top having two longitudinal side edges, and guide channels extending along said side edges; and said clamp means comprising a carrier having support elements movable in the guide channels so that the carrier moves parallel to the table top.

8. The device, as described in claim 7, wherein said clamp means comprises a lower jaw insertable into a slit in the fish body, and an upper jaw movable downwardly toward the lower jaw so that the skin of the fish is gripped between the two jaws.

9. The device, as described in claim 8, and further comprising a roller mounted in the table top so that a portion of the roller is located above the table top surface; and said upper jaw having a cam follower engageable with said roller when the clamp means is in its starting position, whereby the upper jaw is then raised away from the lower jaw.

10. The device, as described in claim 9, and further comprising means for pivotably mounting said jaws in the carrier so that the jaws can rotate as a unit around a horizontal axis extending transverse to the movement axis of the carrier.

11. The device, as described in claim 10, and further comprising stop means for limiting the pivotal movement of said jaws to approximately thirty degrees.

12. The device, as described in claim 1, wherein said anchoring means comprises a handle swingably connected to said fish support means, and a fish-penetrating spike carried by said handle, whereby movement of the handle in one direction causes the spike to penetrate the head of the fish, and movement of the handle in the opposite direction releases the spike from the head of the switch.

13. The device, as described in claim 12, wherein said powered means comprises a reversible electric motor; and said device further comprising a motor control switch operated by the swingable handle so that movement of the handle in said one direction causes the motor control switch to operate the motor in the direction that moves the clamp means forwardly from the starting position toward the end limit position.

14. The device, as described in claim 1, wherein said arm structure has an operating position and a retracted position; and said clamp means being interconnected with said arm structure so that the arm structure is moved from its retracted position to its operating position as the clamp means approaches its end limit position.

15. The device, as described in claim 14, wherein said fish support means comprises a horizontal table top; and said arm structure being pivotably connected to said table top for swinging movement between a retracted position located substantially entirely below the table top surface and an operating position above the table top surface.

16. The device, as described in claim 15, wherein said arm structure comprises a roller located above the table top surface when the arm structure is in its operating position.

17. The device, as described in claim 15, and further comprising a cam operator means for moving said arm structure between its retracted position and its operating position; said cam operator means comprising a first plate slidably mounted on said table top for movement parallel to the movement axis of said clamp means, and a second plate slidably mounted on said table top for movement transverse to the movement axis of said clamp means.

18. The device, as described in claim 17, and further comprising cam slot means in one of said plates, and pin means on the other plate; and said cam slot means and said pin means being operatively connected so that said first plate acts as an operator for said second plate.

19. The device, as described in claim 18, wherein said clamp means comprises a carrier having a lower wall portion located below said table top; said first plate being in horizontal registry with the lower wall portion of the carrier so that when the carrier is approaching the end limit position said first plate is moved to operate the second plate.

20. The device, as described in claim 19, and further comprising a flexible connector extending between said first plate and the lower wall portion of the carrier so that when the carrier is approaching the starting position said first plate is pulled to a position wherein said arm structure is lowered to its retracted position.

* * * * *